(No Model.) 3 Sheets—Sheet 1.

J. A. BRADBURN.
APPARATUS FOR MAKING SODIUM CARBONATE.

No. 548,174. Patented Oct. 22, 1895.

Witnesses:
Mark W. Dewey
R. S. Dewey

Inventor.
Joseph A. Bradburn
By C. H. Duell
his Attorney.

(No Model.)

J. A. BRADBURN.
APPARATUS FOR MAKING SODIUM CARBONATE.

No. 548,174.    Patented Oct. 22, 1895.

Witnesses—

Inventor—
Joseph A. Bradburn
By C. H. Duell atty.

(No Model.) 3 Sheets—Sheet 3.

J. A. BRADBURN.
APPARATUS FOR MAKING SODIUM CARBONATE.

No. 548,174. Patented Oct. 22, 1895.

Witnesses:
Mark W. Dewey
R. S. Lewey

Inventor.
Joseph A. Bradburn
By C. H. Duell
his Attorney.

UNITED STATES PATENT OFFICE.

JOSEPH A. BRADBURN, OF SYRACUSE, NEW YORK.

APPARATUS FOR MAKING SODIUM CARBONATE.

SPECIFICATION forming part of Letters Patent No. 548,174, dated October 22, 1895.

Application filed August 23, 1894. Serial No. 521,053. (No model.)

*To all whom it may concern:*

Be it known that I, JOSEPH A. BRADBURN, of Syracuse, in the county of Onondaga, in the State of New York, have invented new and useful Improvements in Apparatus for the Manufacture of Carbonate of Soda, of which the following, taken in connection with the accompanying drawings, is a full, clear, and exact description.

My invention relates to apparatus for the manufacture of carbonate of soda, and the object is to mingle the gas and liquor more thoroughly and intimately in the carbonating-tower, thereby enabling a greater product to be obtained, and to so treat the liquor produced in said tower that it shall be utilized more efficiently, the whole forming an apparatus working continuously and conjointly.

My apparatus comprises a carbonating-tower, a heater-tower, and a distiller-tower, the two last being generally combined together. In the carbonating-tower the ammoniated brine is treated with carbonic-acid gas. When sufficiently treated it is led through a filter to separate the bicarbonate of soda, and then is treated in the distiller to regain the ammonia which goes to make more ammoniated brine to go again through the same series of operations.

My improvements relate particularly to the construction of the towers in which the liquors are treated.

Figure 1:
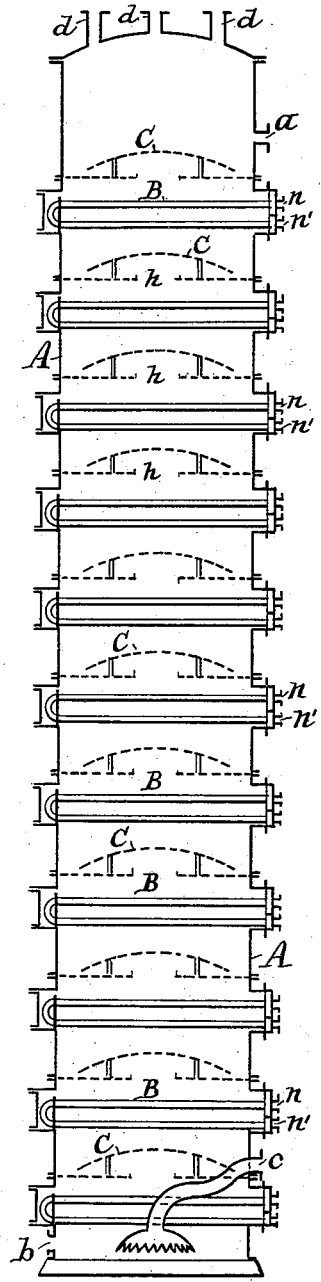
Figure 2:
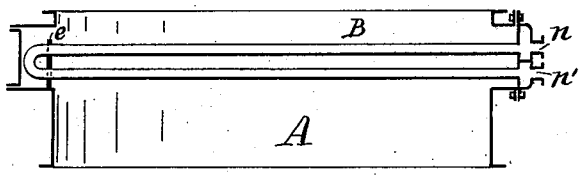
Figure 3:
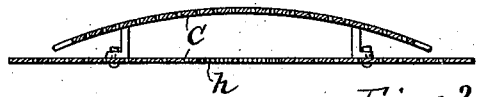
Figure 4:
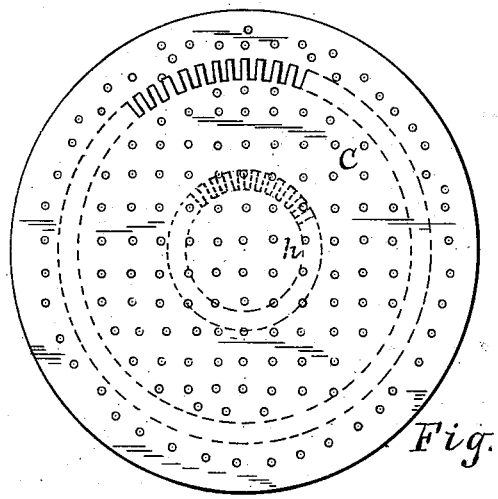
Figure 5:
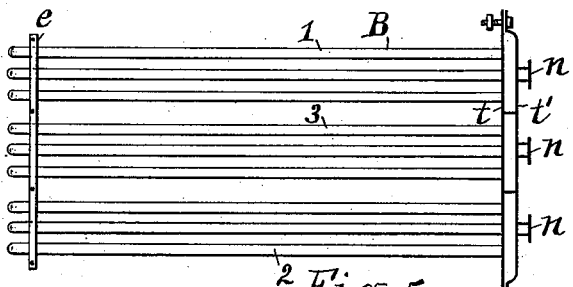
Figure 6:
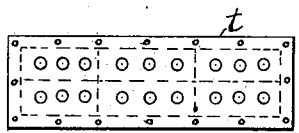
Figure 7:
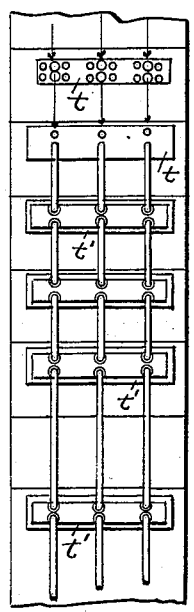
Figure 8:
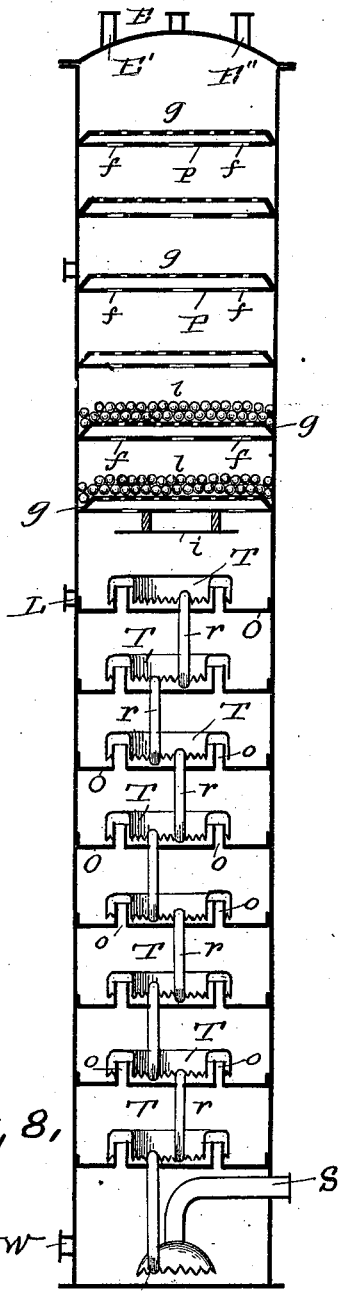
Figure 9:
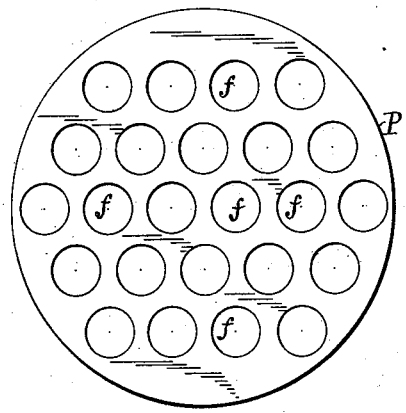
Figure 10:
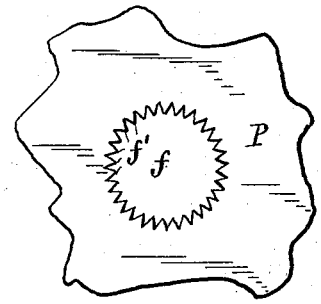
Figure 11:
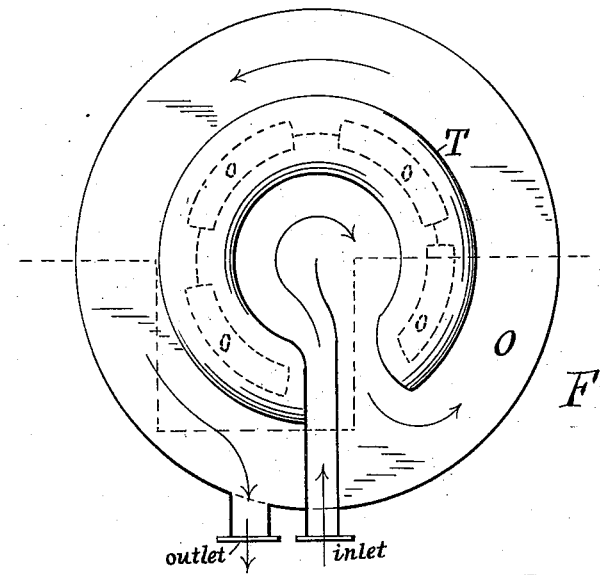
Figure 12:
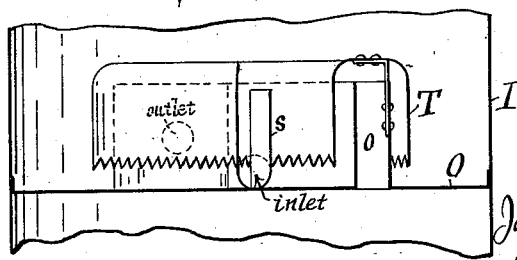

In the drawings accompanying this specification and forming a part hereof, Figure 1 represents a vertical section of the carbonating-tower. Fig. 2 is an enlarged vertical section of one of the sections or cylinders of the tower. Fig. 3 represents an enlarged vertical section of one of the perforated composite plates used in the tower. Fig. 4 is a top plan view of the said composite plate. Fig. 5 is a top plan view of one of the batteries of cooling-tubes, shown also in Fig. 2. Fig. 6 is the front side elevation of the plate through and from which the said tubes extend. Fig. 7 shows several batteries of tubes connected together. Fig. 8 designates the combination heating and distilling tower. Fig. 9 is a top plan view of a perforated plate used in this tower. Fig. 10 shows an enlarged view of one of the perforations in said plate; and Figs. 11 and 12 are top plan and side views, respectively, of one of the plates and hoods employed in the distiller-tower.

Referring specifically to the drawings, A in Fig. 1 represents a series of cast-iron cylinders placed one upon another and secured together by suitable and well-known means. Each of said cylinders is provided with a battery of cooling-tubes B B, &c., and with perforated plates C C, &c.

$a$ is the inlet for the liquor.

$b$ is the outlet for the liquor; $c$, the inlet for the carbonic-acid gas, and $d\ d\ d$ the outlet for unabsorbed gas.

A battery of cooling-tubes B is shown clearly in Figs. 2 and 5. The two ends of each tube, bent upon itself, are fitted into a tube-plate $t$, and a number of such tubes with the tube-plate. The cover $t'$, with nozzle $n\ n'$ and a fastening-bar $e$ at or near the bend of the tubes, constitute a removable cooling device which can be taken out bodily from any of the several cylinders of the tower and examined for cleansing or scaling and is readily replaced again. Fig. 2 shows one of the cylinders or sections A of the tower with the tubes fitted in. Fig. 3 shows a composite plate C placed between the cylinders to distribute the gas in bubbles in the liquor. The distinguishing feature of this plate is that the lower part or flat plate is perforated with as many small holes as it can bear, beside which the plate is provided with teeth around the large hole $h$ in the center. The top part or curved perforated plate is such as is commonly used. The perforations in the lower plate and the teeth around the large central hole increase the commingling of the gas and liquor and enable more gas and liquor to be treated in the tower, besides which the tendency of the tower to block itself with the precipitated bicarbonate of soda is much lessened.

The cooling-battery of tubes shown in Fig. 5 is divided into three sections, two outer 1 and 2 and a central one 3. The cooling-water enters at $n$ of each section of each battery of cooling-tubes and leaves by $n'$, as shown in Fig. 2, and the 1 and 2 sections connect with the 1 and 2 sections of the other batteries. Likewise the 3 or central sections connect with the 3 or central sections of the other batteries, as shown in Fig. 7. The outlet $n'$ of one section connects with the inlet $n$ of the lower section when the batteries are connected in consecutive series; but the arrangement of the course of the cooling-water is made to suit the cooling required for some sections, or some batteries may be cut out of the circuit or circuits, according as more or less work is being done in the tower. I use as a rule more cooling-water in the central or 3 sections than in the outer or 1 and 2 sections.

Fig. 8 represents that part of the apparatus in which the ammonia is recovered from the liquor produced in the carbonating-tower. It is composed of a heater-tower H, placed on a distiller-tower D. The heater-tower is built up of cast-iron cylinder G, and between the cylinders are cast-iron plates P, containing each a number of holes $f$. The iron around each hole is cut into teeth $f'$, as shown in Fig. 10. Resting on each plate P in the heater-tower is a grid $g$, which stands about six inches above the plate, and on the grid are two rows of hollow iron balls $l$, as shown in Fig. 8.

The distiller-tower D is a cylinder built of wrought-iron plates I and is divided into compartments by horizontal cast-iron plates O, having openings from which extend upward the short passages $o$, which are segmental in horizontal section, as indicated by dotted lines in Fig. 11 of the drawings. Over the tunnel-openings is a hood T, forming nearly a circle, as shown in Fig. 11, and provided with teeth, as shown in Fig. 8. Each compartment of the distiller-tower is provided with overflow-pipes, as shown at $r\,r$ in Fig. 8. These pipes extend upward above the lower edges of the hoods, so as to maintain the level of the liquid in each compartment above said edges. The hood is in the shape of an inverted U in cross-section, and its edges extend down below the upper ends of the passages $o'$, so as to compel the steam and ammonia-gas to pass down through the liquid collected in each compartment on its way out of the distilling-tower.

I will now describe the treatment of the liquor in the apparatus. The ammoniated brine enters the carbonating-tower at or near the top of the tower shown in Fig. 1, and carbonic-acid gas is pumped into the tower at $c$. The tower is kept filled with liquor to about the opening $a$, the liquor being continually flowing in at said inlet $a$ and being drawn out at the bottom at $b$, meeting and absorbing during its journey down the tower the carbonic-acid gas, the liquor and gas being caused to mingle with each other by the perforated plates C C, and the heat produced by the absorption of the gas is carried away by the cooling-water flowing in the pipes B, which are in each compartment of the tower. The liquor leaving the tower at $b$ is filtered to separate the bicarbonate of soda and then passes to the heater-tower H, entering at E, Fig. 8, and trickling over the balls and plates is deprived of its carbonic acid and carbonates of ammonia by the hot ammonia gas and steam coming from the distiller-tower below. On arriving at the bottom of the heater-tower the liquor continues its journey into the distiller-tower, where it at once meets with milk of lime entering at L. The perforated plate $i$ serves to prevent lime being projected into the heater-tower by the boiling and agitated liquor in the distiller-tower. The milk of lime liberates the ammonia from the fixed ammonium salts, and as the liquor flows down from one compartment to another this ammonia is driven out of the liquor by steam, which is continuously blown in at S. The spent liquor runs away at W and the ammonia and ammonium carbonates, together with more or less steam, leave the apparatus at E' and E". The ammonia and ammonium carbonates are cooled in suitable coolers, where most of the water vapor or steam is condensed, the condensate flowing back into the heater-tower at M. The dried ammonia-gases are then absorbed in fresh brine, which is treated as hereinbefore described.

Having described my invention, what I claim as new, and desire to secure by Letters Patent, is—

1. In an apparatus for the manufacture of carbonate of soda, a heater tower consisting of a plurality of iron cylinders mounted on each other, perforated plates supported horizontally in the tower between the said cylinders, a circular grid raised above the central portion of each plate and resting on the same near its edges, two layers of hollow iron balls lying on each grid, and the outlets and inlets for said tower, as set forth.

2. In an apparatus for the manufacture of carbonate of soda, a distiller tower formed of wrought iron plates, a series of horizontal cast iron plates supported equal distances apart in said tower, each plate being provided with openings, the passages extending upward therefrom a hood supported above the openings in each plate and provided with teeth in its edges, channels secured to the plates, and the outlets and inlets for the channels, as set forth.

3. In an apparatus for the manufacture of carbonate of soda, a distiller tower formed of wrought iron, a series of horizontal iron plates supported in the tower and separated from each other, each plate provided with curved openings in each of said plates, the passages extending upward therefrom a curved hood supported above said openings in each plate and provided with teeth in its edges, U shaped channels secured to the top side of said plates, and the outlets and inlets for the channels, as set forth.

In testimony whereof I have hereunto signed my name.

JOSEPH A. BRADBURN. [L. S.]

Witnesses:
 MARK W. DEWEY,
 H. M. SEAMANS.